United States Patent
Hutchinson et al.

(10) Patent No.: US 7,317,493 B1
(45) Date of Patent: Jan. 8, 2008

(54) METHOD AND APPARATUS FOR PROVIDING DUAL AUTOMATIC GAIN CONTROL DELAY SETTINGS IN A TELEVISION RECEIVER

(75) Inventors: Daniel Mark Hutchinson, Carmel, IN (US); Gary Dean Grubbs, Indianapolis, IN (US); Matthew Thomas Mayer, Indianapolis, IN (US); Ricardo Haro, El Paso, TX (US)

(73) Assignee: Thomson Licensing, Boulogne-Billancourt (FR)

( * ) Notice: Subject to any disclaimer, the term of this patent is extended or adjusted under 35 U.S.C. 154(b) by 507 days.

(21) Appl. No.: 10/031,059

(22) PCT Filed: Jul. 13, 2000

(86) PCT No.: PCT/US00/19115

§ 371 (c)(1),
(2), (4) Date: Aug. 14, 2003

(87) PCT Pub. No.: WO01/06777

PCT Pub. Date: Jan. 25, 2001

Related U.S. Application Data

(60) Provisional application No. 60/144,423, filed on Jul. 16, 1999.

(51) Int. Cl.
 H04N 5/52 (2006.01)
 H04N 5/46 (2006.01)
(52) U.S. Cl. .................. 348/678; 348/555; 348/725
(58) Field of Classification Search ............. 348/678, 348/679, 554, 555, 553, 707, 725; 455/232.1; H04N 5/52, H04N 5/46
See application file for complete search history.

(56) References Cited

U.S. PATENT DOCUMENTS

| 4,233,630 A | 11/1980 | Baker et al. ............ 358/167 |
| 4,707,730 A | 11/1987 | Alard ..................... 358/13 |
| 5,134,707 A | 7/1992 | Sakashita et al. ........ 455/3.2 |

(Continued)

FOREIGN PATENT DOCUMENTS

EP 0944255 9/1999

(Continued)

OTHER PUBLICATIONS

Patent Abstracts of Japan, vol. 1999, No. 09, Jul. 30, 1999 and J11-098426.

*Primary Examiner*—Sherrie Hsia
(74) *Attorney, Agent, or Firm*—Joseph J. Laks; Robert D. Shedd; Reitseng Lin

(57) ABSTRACT

The present invention provides a method and apparatus for processing a received television signal comprising one of a first type of television signal and a second type of television signal. Specifically, the method comprises amplifying the received television signal in response to a control signal. If the received television signal comprises the first type of television signal, the RF amplifier gain is reduced when the received television signal exceeds a first signal level. If the received television signal comprises the second type of television signal, the RF amplifier gain is reduced when the received television signal exceeds a second signal level. The second signal level is greater than the first signal level. A concomitant apparatus is also provided. As the first signal level is lower for the first type of television signal, reception of the first type of television signal is improved.

20 Claims, 1 Drawing Sheet

U.S. PATENT DOCUMENTS

| | | | |
|---|---|---|---|
| 5,138,457 A | 8/1992 | Sakai et al. | 358/196 |
| 5,225,898 A | 7/1993 | Imai et al. | 358/36 |
| 5,283,653 A | 2/1994 | Citta | |
| 5,410,363 A | 4/1995 | Capen et al. | 348/679 |
| 5,565,932 A | 10/1996 | Citta et al. | 348/678 |
| 5,659,372 A | 8/1997 | Patel et al. | 348/731 |
| 5,822,017 A | 10/1998 | Mok | |
| 5,940,143 A * | 8/1999 | Igarashi et al. | 348/678 |
| 5,966,186 A | 10/1999 | Shigihara et al. | 348/570 |
| 5,982,457 A | 11/1999 | Limberg | 348/725 |
| 6,014,180 A * | 1/2000 | Kawano | 348/678 |
| 6,061,096 A | 5/2000 | Limberg | 348/555 |
| 6,108,044 A | 8/2000 | Shin | |
| 6,108,046 A | 8/2000 | Wu et al. | |
| 6,233,295 B1 | 5/2001 | Wang | |
| 6,353,463 B1 | 3/2002 | Seo | |
| 6,512,554 B1 * | 1/2003 | Ogasawara | 348/678 |
| 6,519,298 B1 | 2/2003 | Kim | |

FOREIGN PATENT DOCUMENTS

| | | |
|---|---|---|
| JP | 61-131626 | 6/1986 |
| JP | 2-100506 | 4/1990 |
| JP | 11-98426 | 4/1999 |
| KR | 9870192 | 10/1998 |

* cited by examiner

METHOD AND APPARATUS FOR PROVIDING DUAL AUTOMATIC GAIN CONTROL DELAY SETTINGS IN A TELEVISION RECEIVER

This application claims the benefit under 35 U.S.C. § 365 of International Application PCT/US00/19115, filed Jul. 13, 2000, which was published in accordance with PCT Article 21(2) on Jan. 25, 2001 in English; and which claims benefit of U.S. provisional application Ser. No. 60/144,423 filed Jul. 16, 1999.

FIELD OF THE INVENTION

This invention relates to a television receiver capable of receiving analog and digital television signals. In particular, the invention is directed to improving the reception of digital television signals.

BACKGROUND OF THE INVENTION

In order to facilitate the transition from conventional analog television systems to digital television systems, current television receivers are capable of receiving and processing both analog television signals, e.g., National Television Standard Committee (NTSC) television signals, and digital television signals, e.g., high definition television (HDTV) signals. FIG. 1 depicts a high level block diagram of a tuner portion 100 of such a television receiver. An exemplary television receiver is disclosed in U.S. patent application Ser. No. 09/140,257, filed Aug. 26, 1998, which is herein incorporated by reference.

The tuner portion 100 comprises an antenna 102, a radio frequency (RF) tuner 104, an intermediate frequency (IF) module 106 and an automatic gain control (AGC) circuit 108. A RF modulated input television signal is received at the antenna 102 or other input terminal such as a cable television set top box, satellite television set top box and the like. The input television signal may comprise either an analog NTSC television signal or a digital HDTV television signal. The RF tuner 104 tunes the input television signal for a particular channel and down converts the input television signal to an IF television signal. The IF tuner 106 converts the IF television signal into a downstream, baseband television signal. The AGC circuit 108 receives the baseband television signal and derives an AGC control signal coupled to an amplifier in the RF tuner 104. The gain of the RF tuner 104 is adjusted in response to the AGC control signal.

However, the transition from analog television systems to digital television systems requires using additional bandwidth in the existing terrestrial television spectrum. Each television broadcast station is allocated an additional broadcast channel to transmit the HDTV television signal or multiple standard definition digital signals. This channel requires usage of additional bandwidth over the currently allocated bandwidth utilized to transmit analog NTSC television signals. With these additional channels, the broadcast television signal is more susceptible to cross-modulation and inter-modulation distortion. As such, the television receiver must improve its linearity performance in view of distortion associated with the input television signal.

Therefore, a need exists in the art to improve the reception of television signals.

SUMMARY OF THE INVENTION

The present invention provides a method and apparatus for processing a received television signal comprising one of a first type of television signal and a second type of television signal. Specifically, the method comprises amplifying said received television signal in response to a control signal. If the received television signal comprises the first type of television signal, the RF amplifier gain changes when said received television signal exceeds a first signal level. If the received television signal comprises the second type of television signal, the RF amplifier gain changes when said received television signal exceeds a second signal level. The second signal level is greater than said first signal level. A concomitant apparatus is also provided. As the first signal level is lower for the first type of television signal, reception of the first type of television signal is improved.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
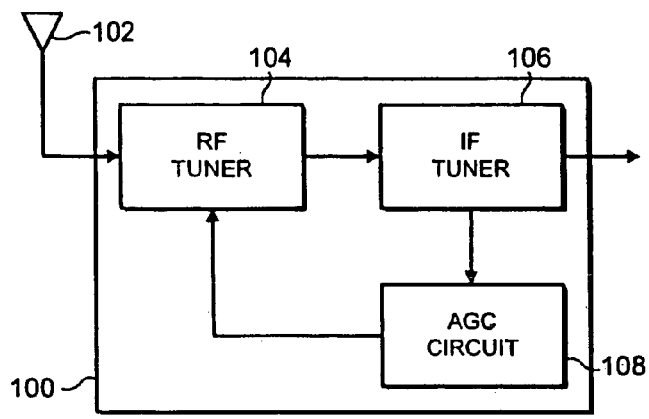
FIG. 1 depicts a high level block diagram of a tuner portion of a television receiver capable of receiving both analog and digital television signals.
Figure 2:
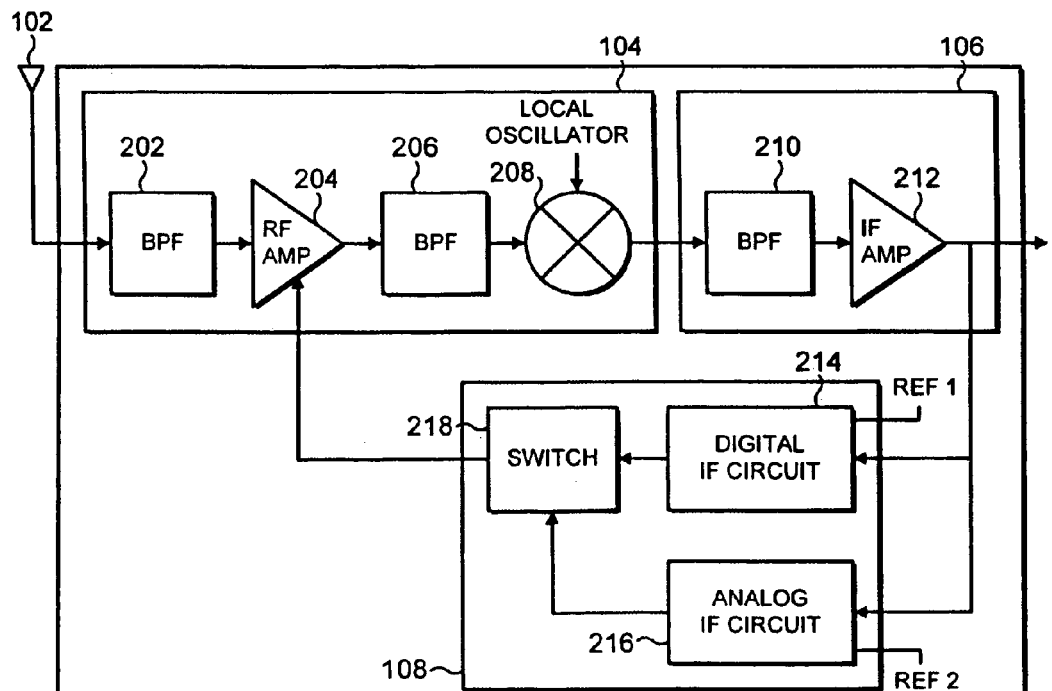
FIG. 2 depicts a more detailed block diagram of the tuner portion of FIG. 1 in accordance with the present invention.

FIG. 2 depicts a more detailed block diagram of the tuner portion 100 of FIG. 1 in accordance with the present invention. Specifically, the RF tuner 104 comprises a first bandpass filter 202, a RF amplifier 204, a second bandpass filter 206 and a mixer 208. The first bandpass filter 202 allows or passes the input television signal within a frequency range defined by a selected television channel. The RF amplifier 204 amplifies the signal level or amplitude of the filtered television signal in response to a control signal, e.g., an automatic gain control (AGC) signal, from an AGC circuit 108. After filtering the amplified television signal with the second bandpass filter 206, the mixer 208 uses a local oscillator to convert the input television signal into an intermediate frequency (IF) television signal. The frequency of the local oscillator is generally dependent on the selected television channel.

The IF tuner 106 comprises a bandpass filter 210 and an IF amplifier 212. The bandpass filter 210 passes the IF television signal within an IF range. The filtered signal is amplified by the IF amplifier 212 prior to being converted into a baseband television signal using a mixer (not shown). Once the IF television signal is converted into baseband, the television signal is sent downstream for further processing in other portions of the television receiver not shown. The baseband television signal is also coupled to the AGC circuit 108.

In the context of the present invention, the RF amplifier 204 amplifies the television signal to optimize the trade-off between the signal to noise ratio (SNR) and distortion at the television receiver. The television signal is amplified by adjusting the gain of the RF amplifier in response to an AGC signal from the AGC circuit 108. To achieve an acceptable SNR at the television receiver, the signal level of the amplified television signal, i.e., at the mixer 208 input, must be high enough to overcome the noise figure of the mixer 208 and other downstream circuits. However, the signal level of the amplified television signal must also be low enough to avoid distortion from the linearity limitation of the mixer and other downstream circuits.

Thus, at low signal levels of the input television signal, the television signal is amplified at the maximum gain of the RF amplifier 204. The signal level of the amplified television signal is increased at maximum gain until reaching an optimal signal level at the mixer 208 input. Once the optimal signal level of the television signal is reached, the gain of the RF amplifier 204 is reduced, in order to maintain this optimal signal level. The signal level at which the gain of the RF amplifier 104 is reduced is the RF AGC Delay Point.

Significant differences exist between analog NTSC and digital HDTV television signals in the SNR required to demodulate and provide noise free video in the television receiver. For the analog NTSC television signal, the output from the tuner portion 100 must have a SNR of at least 50 decibels (dB) to present downstream video with a noise free picture. However, for the digital HDTV television signal, the output from the tuner portion 100 only requires a SNR of greater than approximately 17 dB to present a downstream noise free picture. As such, gain reduction of the RF tuner 104 may occur at a much lower signal level for digital television signals than for analog television signals. Namely, the RF AGC Delay Point for digital television signals can be provided at a much lower signal level than the RF AGC Delay Point for analog television signals.

The cross-modulation and inter-modulation performance of the RF tuner 104 improves when the gain of the RF tuner 104 is reduced. Namely, as the gain of the RF tuner 104 is reduced, a higher input signal level is required to produce a certain level of cross-modulation and inter-modulation distortion. In one such television system, the cross-modulation performance of the RF tuner 104 has been empirically determined to improve at least 1 dB for every 1 dB of reduction in the gain of the RF tuner 104.

To advantageously utilize the lower RF AGC Delay Point of digital television signals, the present invention implements dual RF AGC Delay Points for digital and analog television signals. By implementing a lower RF AGC Delay Point for digital television signals, gain reduction starts at a lower signal level of the digital television signal. As the RF amplifier 204 is operating at a lower gain for digital television signals, the cross-modulation performance, i.e., the linearity performance of the tuner portion 100 to cross-modulation and inter-modulation distortion, is significantly improved for digital television signals.

Returning to FIG. 2, the AGC circuit 108 receives the baseband television signal and generates an AGC signal coupled to the RF amplifier 204. The AGC circuit 108 implements dual RF AGC Delay Points in accordance with the present invention. Specifically, the AGC circuit 108 comprises a digital IF circuit 214, an analog IF circuit 216 and a switch 218. The AGC signal is provided by the digital IF circuit 214 if the received input television signal comprises a digital HDTV television signal. Alternatively, the AGC signal is provided by the analog IF circuit 216 if the received input television signal comprises an analog NTSC television signal. The AGC signal is routed to the RF amplifier 204 from either the analog IF circuit 216 or the digital IF circuit 218 via the switch 218.

In the context of the present invention, a first reference level, REF. 1, is provided to configure the RF AGC Delay Point of the digital television signal. Once the first reference level, REF. 1, is selected, the digital IF circuit 214 decreases the value of the AGC control signal when the signal level of the amplified input television signal exceeds a first signal level, i.e., the AGC Delay Point of the digital television signal. In response to the decreased AGC control signal, the gain of the RF amplifier 204 is decreased, thereby amplifying the input television signal to a lower level. The gain of the RF amplifier 204 is also increased when the AGC control signal is increased by the digital IF circuit 214.

In a similar manner, a second reference level, REF. 2, is provided to configure the RF AGC Delay Point of the analog television signal. Once the second reference level, REF. 2, is selected, the analog IF circuit 216 decreases the level of the AGC control signal when the signal level of the amplified input television signal exceeds a second signal level, i.e., the AGC Delay Point of the analog television signal. The AGC Delay Point of the analog television signal is generally set higher than the AGC Delay Point of the digital television signal in accordance with the present invention. As with digital television signals, however, the gain of the RF amplifier 204 is decreased in response to the decreased AGC signal, thereby amplifying the input television signal to a lower level. The gain of the RF amplifier 204 is also increased when the AGC control signal is increased by the analog IF circuit 216.

As a much lower SNR is required to produce a noise free picture from the digital television signal, the RF AGC Delay Point is generally much lower for digital television signals than for analog television signals. In one such television system, the RF AGC Delay Point, e.g., the point where gain reduction would begin, was empirically determined to occur when the signal level of the input television signal is approximately −59 dBm (dBm: decibels referenced to one milliwatt) for digital HDTV television signals. In contrast, the RF AGC Delay Point was empirically determined at approximately −49 dBm for analog NTSC television signals. Thus, the tuner portion 100 initiates gain reduction approximately 10 dB earlier for digital television signals.

In another embodiment of the present invention, the gain of the RF tuner 104 can be dynamically reduced based upon an estimate of the input television signal. By dynamically reducing the gain of the RF tuner 104, the linearity performance of the tuner portion 100 is improved when terrestrial digital television signals are received in the presence of adjacent channel interference. Specifically, in order to choose the best compromise between noise and linearity performance, the gain of the RF tuner 104 can be dynamically adjusted based upon an estimate of the amplitude or signal level of the desired and interfering input signal levels. The estimate of the input signal level is determined by measuring voltage level of the control signal, e.g., the RF AGC signal, using an aligned AGC Delay Point and a predetermined tuner gain curve.

Although various embodiments which incorporate the teachings of the present invention have been shown and described in detail herein, those skilled in the art can readily devise many other varied embodiments that will still incorporate these teachings.

What is claimed is:

1. Method for processing a received television signal comprising one of a digital television signal and an analog television signal, the method comprising:

amplifying said received television signal in response to a control signal, where said amplifying occurs when said received television signal exceeds a first signal level if said received television signal comprises said digital television signal, said amplifying occurs when said received television signal exceeds a second signal level if received television signal comprises said analog television signal, and wherein said first signal level and said second signal level have a predetermined relationship of said second signal level being greater than said first signal level.

2. The method of claim 1 wherein said digital television signal comprises a high definition television (HDTV) signal and said analog television signal comprises a National Television Standard Committee (NTSC) television signal.

3. The method of claim 1 further comprising:
sending said received television signal downstream for further processing upon amplifying said received television signal.

4. The method of claim 1 further comprising:
amplifying said received television signal up to the first signal level and prior to said amplifying in response to said control signal if said received television signal comprises said digital television signal, where said amplifying up to the first signal level is performed at a higher amplification level than said amplifying in response to said control signal.

5. The method of claim 1 further comprising:
amplifying said received television signal up to the second signal level and prior to said amplifying in response to said control signal if said received television signal comprises said analog television signal, where said amplifying up to the first signal level is performed at a higher amplification level than said amplifying in response to said control signal.

6. The method of claim 1 wherein said first signal level represents an automatic gain control (AGC) delay point of said digital television signal and said second signal level represents the AGC delay point of said analog television signal.

7. The method of claim 6 wherein the AGC delay point of said digital television signal is less than the AGC delay point of said analog television signal.

8. The method of claim 1 wherein said amplifying comprises:
decreasing a value of said control signal when said received television signal exceeds a first signal level if the received television signal comprises said digital television signal, where the amplifying occurs in response to the decreased value of said control signal.

9. The method of claim 1 wherein said amplifying comprises:
decreasing a value of said control signal when said received television signal exceeds a second signal level if the received television signal comprises said analog television signal, where the amplifying occurs in response to the decreased value of said control signal.

10. The method of claim 1 wherein said amplifying comprises:
decreasing a gain of a radio frequency (RF) tuner processing said received television signal.

11. The method of claim 10 wherein the gain of the RF tuner is dynamically reduced based on an estimated signal level of said received television signal.

12. The method of claim 11 further comprising:
measuring a value of said control signal from said first signal level and a gain curve of the RF tuner; and
determining said estimated signal level from the value of said control signal.

13. The method of claim 1 wherein said control signal comprises an AGC signal provided from an intermediate frequency (IF) AGC circuit.

14. The method of claim 1 wherein said amplifying occurs to maintain the signal level of said amplified television signal at the first signal level if said received television signal comprises said digital television signal, and said amplifying occurs to maintain the signal level of said amplified television signal at the second signal level if said received television signal comprises said analog television signal.

15. An apparatus for processing a received television signal comprising one of a digital television signal and an analog television signal, the apparatus comprising:
a radio frequency (RF) tuner for receiving said received television signal and amplifying said received television signal in response to a decreased value of a control signal; and
an automatic gain control (AGC) circuit, coupled to said RF tuner, for adjusting said control signal to said RF tuner, where the value of said control signal is decreased when said received television signal exceeds a first signal level if said received television signal comprises said digital television signal, the value of said control signal is decreased when said received television signal exceeds a second signal level if received television signal comprises said analog television signal, and wherein said first signal level and said second signal level have a predetermined relationship of said second signal level being greater than said first signal level.

16. The apparatus of claim 15 further comprising:
an intermediate frequency (IF) tuner, coupled to said RF tuner and said ACG circuit, for receiving an IF television signal from said RF tuner, converting said IF television signal into a baseband television signal, and providing said baseband television signal to said AGC circuit and downstream for further video processing.

17. The apparatus of claim 15 wherein said RF tuner comprises:
a RF amplifier for amplifying said received television signal in response to a decreased value of a control signal.

18. The apparatus of claim 15 wherein said AGC circuit comprises:
a digital IF circuit for decreasing the value of said control signal when said received television signal exceeds a first signal level if said received television signal comprises said digital television signal; and
an analog IF circuit for decreasing the value of said control signal when said received television signal exceeds a second signal level if received television signal comprises said analog television signal.

19. The apparatus of claim 15 wherein said first signal level represents an automatic gain control (AGC) delay point of said digital television signal and said second signal level represents the AGC delay point of said analog television signal.

20. The apparatus of claim 19 wherein the AGC delay point of said digital television signal is less than the AGC delay point of said analog television signal.

* * * * *